(12) United States Patent
Lu

(10) Patent No.: US 9,388,790 B2
(45) Date of Patent: Jul. 12, 2016

(54) FAN DEVICE FOR HIGH TORQUE OUTPUT

(71) Applicant: Shun-Tsung Lu, Taichung (TW)

(72) Inventor: Shun-Tsung Lu, Taichung (TW)

( * ) Notice: Subject to any disclaimer, the term of this patent is extended or adjusted under 35 U.S.C. 154(b) by 737 days.

(21) Appl. No.: 13/751,332

(22) Filed: Jan. 28, 2013

(65) Prior Publication Data
US 2014/0212280 A1 Jul. 31, 2014

(51) Int. Cl.
*F03D 3/06* (2006.01)

(52) U.S. Cl.
CPC ............ *F03D 3/061* (2013.01); *F05B 2210/16* (2013.01); *F05B 2240/211* (2013.01); *F05B 2240/215* (2013.01); *F05B 2240/217* (2013.01); *Y02E 10/74* (2013.01)

(58) Field of Classification Search
CPC ....... F03D 3/02; F03D 3/061; F05B 2210/16; F05B 2240/211; F05B 2240/215; F05B 2240/217; F05B 2240/301
See application file for complete search history.

(56) References Cited

U.S. PATENT DOCUMENTS

| | | | | |
|---|---|---|---|---|
| 1,640,269 A | * | 8/1927 | Ellison | F03D 3/0472 415/36 |
| 4,382,191 A | * | 5/1983 | Potter | F03D 3/02 290/44 |
| 5,133,637 A | * | 7/1992 | Wadsworth | F03D 3/065 415/4.1 |
| 8,198,747 B2 | * | 6/2012 | Kato | F03D 3/02 290/44 |
| 2011/0305557 A1 | * | 12/2011 | Lu | F03D 1/025 415/116 |

* cited by examiner

*Primary Examiner* — Richard Edgar
*Assistant Examiner* — Brian P Wolcott
(74) *Attorney, Agent, or Firm* — patenttm.us

(57) ABSTRACT

A fan device for high torque output has two base plates, multiple fans, and a spindle. The base plates are mounted parallel to each other. The fans are mounted between the base plates, and each fan has an inner side, an outer side, and an inflection point. The spindle is connected with one of the base plates and is located at a middle position of the base plate. A connecting line that connects the inflection point and the spindle is out of an area defined between a connecting line that connects the spindle and the inner side and a connecting line that connects the spindle and the outer side when the inflection point, the inner side, and the outer side are located at the same horizontal plane. Therefore, each fan has a large frontal area to be pushed by fluid.

6 Claims, 9 Drawing Sheets

FAN DEVICE FOR HIGH TORQUE OUTPUT

BACKGROUND OF THE INVENTION

1. Field of the Invention

The present invention relates to a fluid-mechanical device, especially for a fan device for high torque output.

2. Description of Related Art

A fan device is applied for intercepting fluids of wind or liquid, and to generate torque to drive a generator. With reference to FIG. 7, FIG. 8 and FIG. 9, a conventional fan device has two base plates 70, a spindle 80, and multiple fans 90. The base plates 70 are arranged parallel. The spindle 80 is mounted on a middle position on a side of the base plate 70. The fans 90 are circularly mounted between the base plates 70. Each fan 90 has an outer side 91, an inner side 92, and a driven portion 93. The outer side 91 and the inner side 92 are formed on the fan 91 respectively, and the inner side 92 is nearer the spindle 80 than the outer side 91. The driven portion 93 is formed between the outer side 91 and the inner side 92. When the middle position of the driven portion 93, the inner side 92, and the outer side 91 are located at the same horizontal plane and at equal distance from one of the base plates 70, the connecting line that connects the middle position of the driven portion 93 and the spindle 80 is located within the area defined between the connecting line that connects the outer side 91 and the spindle 80 and the connecting line that connects the inner side 92 and the spindle 80.

When the fluid flows across the fans 90, the fluid drives the driven portion 93 to provide a torque for the fans 90 to rotate the base plates 70. When the base plates 70 are driven to rotate, the spindle 80 is also driven to rotate by the base plate 70 that is mounted with the spindle 80. A generator C is connected with the spindle 80 and is provided with the torque by the spindle 80. However, the connecting line that connects the driven portion 93 and the spindle 80 is located within the area between the connecting line that connects the outer end 91 and the spindle 80 and the connecting line that connects the inner end 92 and the spindle 80, so the frontal area of each fan 90 pushed by the fluid is small. Therefore, the speed of the fans 90 is slow, and the torque outputted from the fan device is low.

SUMMARY OF THE INVENTION

The main object of the present invention is to provide a fan device comprising two base plates, multiple fans, and a spindle. The base plates are mounted parallel to each other. The fans are circularly mounted between the base plates and with intervals between the fans. Each fan is elongated and has a longitudinal direction defined from one of the base plates to the other of the base plates, an outer side formed on the fan along the longitudinal direction, an inner side formed on the fan along the longitudinal direction, and a driven portion formed between the outer side and the inner side and having an inflection point.

The spindle is mounted on one of the base plates, located in a middle position of the base plate that is mounted with the spindle, is nearer to the inner side than to the outer side, and has a longitudinal direction parallel with the longitudinal directions of the fans. A connecting line connecting the inflection point and the spindle is located out of an area between a connecting line that connects the outer side and the spindle and a connecting line that connects the inner side and the spindle when the inflection point, the inner side, and the outer side are each respectively at equal distance from the base plate that is mounted with the spindle.

As the connecting line that connects the inflection point and the spindle is located out of the area defined between the connecting line that connects the outer side and the spindle and the connecting line that connects the inner side and the spindle, each fan thus has a large front area to be pushed by the fluid. When the fluid flows across the fan device to push the driven portions, especially the inflection point, the spindle is driven to rotate by the base plates easily. Therefore, the fan device can output higher torque.

DETAILED DESCRIPTION OF PREFERRED EMBODIMENT

Figure 1:
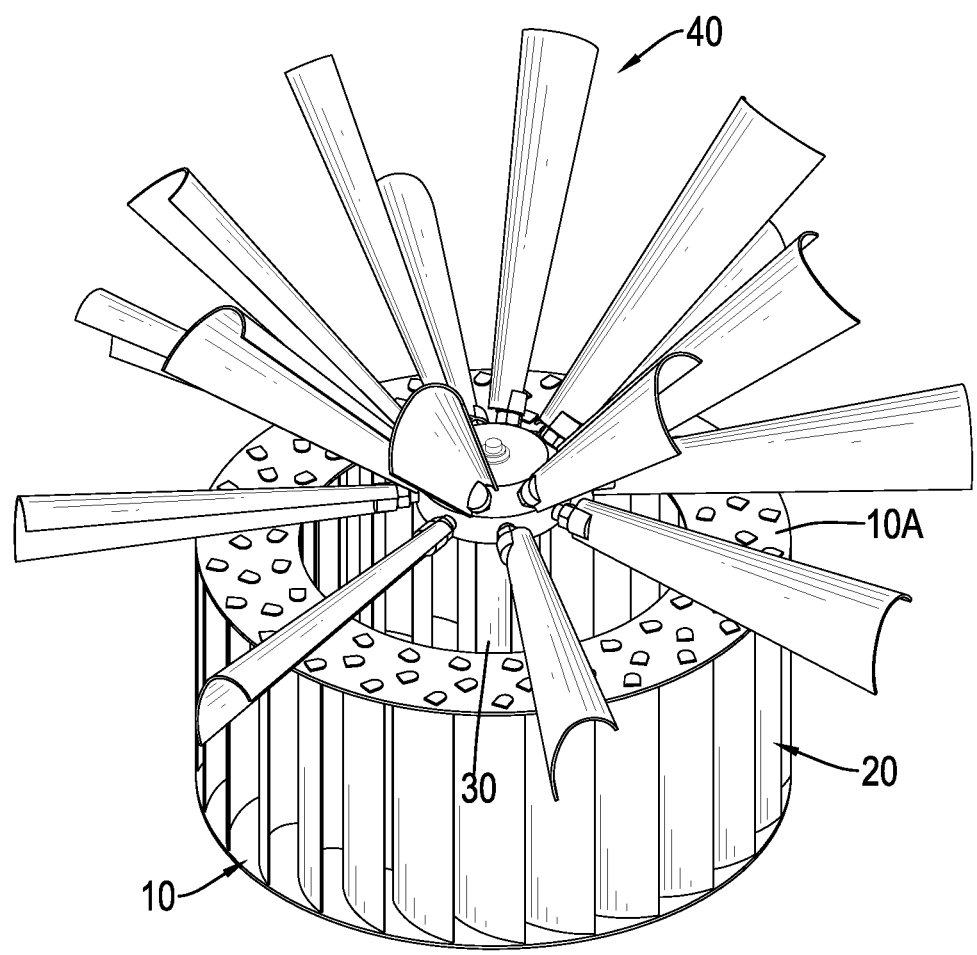
FIG. 1 is a perspective view of a first preferred embodiment of a fan device for high torque output in accordance with the present invention.

With reference to FIG. 1, a first preferred embodiment of a fan device for high torque output in accordance with the present invention comprises two base plates 10, 10A, multiple fans 20, a spindle 30, and a vane module 40.

Figure 2:
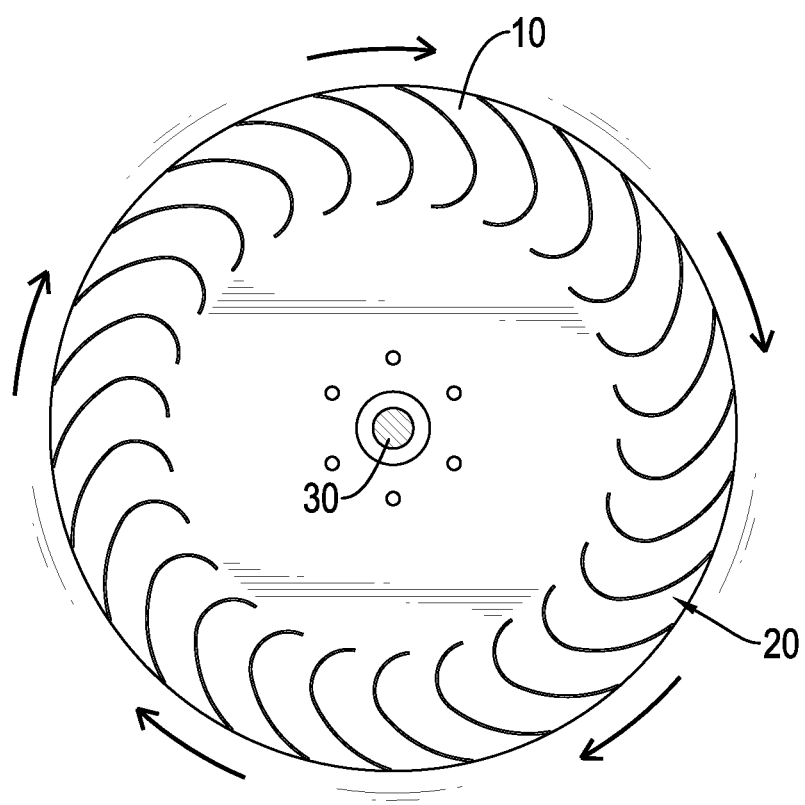
FIG. 2 is a cross sectional top view of the fan device in FIG. 1.
Figure 3:
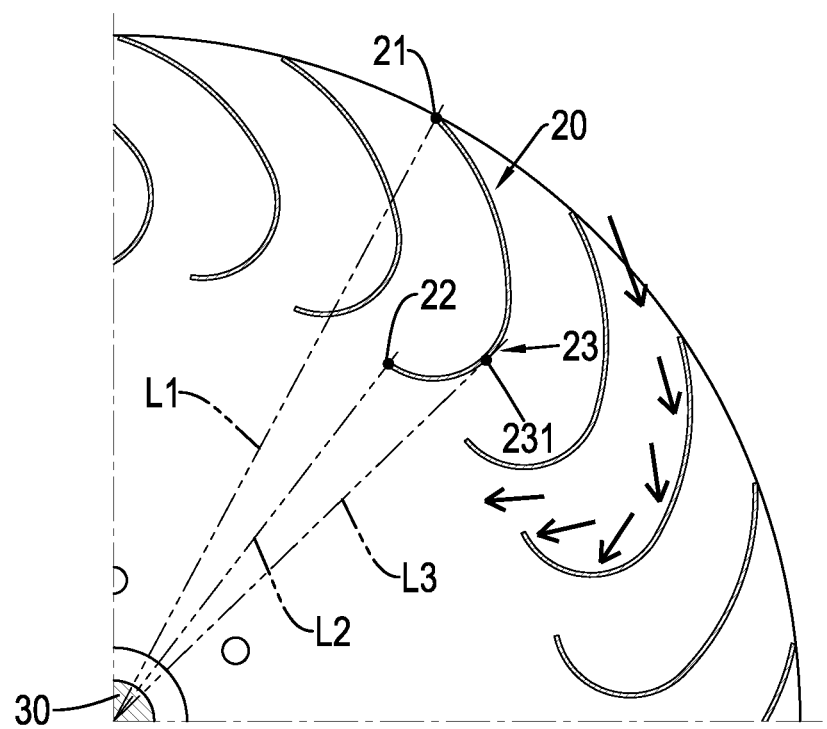
FIG. 3 is an enlarged cross sectional top view of the fan device in FIG. 2.

With reference to FIG. 1, FIG. 2, and FIG. 3, the base plates 10, 10A are mounted parallel to each other. One of the base plates 10 may be round, and the other base plate 10A may be annular. The fans 20 are circularly mounted between the base plates 10, 10A with intervals between the fans 20. Each fan 20 is elongated, hooked, and has a longitudinal direction, an outer side 21, an inner side 22, and a driven portion 23. The longitudinal direction is defined from the base plate 10 to the other base plate 10A, and each fan 20 is mounted between the base plates 10, 10A along the longitudinal direction.

The outer side 21 and the inner side 22 are formed on the fan 20. The inner side 22 and the outer side 21 are each respectively corresponding to an inner side and an outer side of the base plate 10A in position. The driven portion 23 is formed between the outer side 21 and the inner side 22, is curved and has an inflection point 231 at a horizontal plane across the fan 20. The inflection point 231 is nearer to the inner side 22 than to the outer side 21.

The spindle 30 is mounted on the base plates 10, and is located in a middle position of the base plate 10. The spindle 30 has a longitudinal direction that is parallel with the longitudinal directions of the fans 20. The spindle 30 can be connected with a generator C. When the inflection point 231, the inner side 22, and the outer side 21 are located at the same horizontal plane, and when the inflection point 231, the inner side 22, and the outer side 21 are at equal distance from the base plate 10, a connecting line L3 that connects the inflection point 231 and the spindle 30 is located out of the area defined between the connecting line L2 that connects the inner side 22 and the spindle 30 and the connecting line L1 that connects the outer side 21 and the spindle 30.

Figure 4:
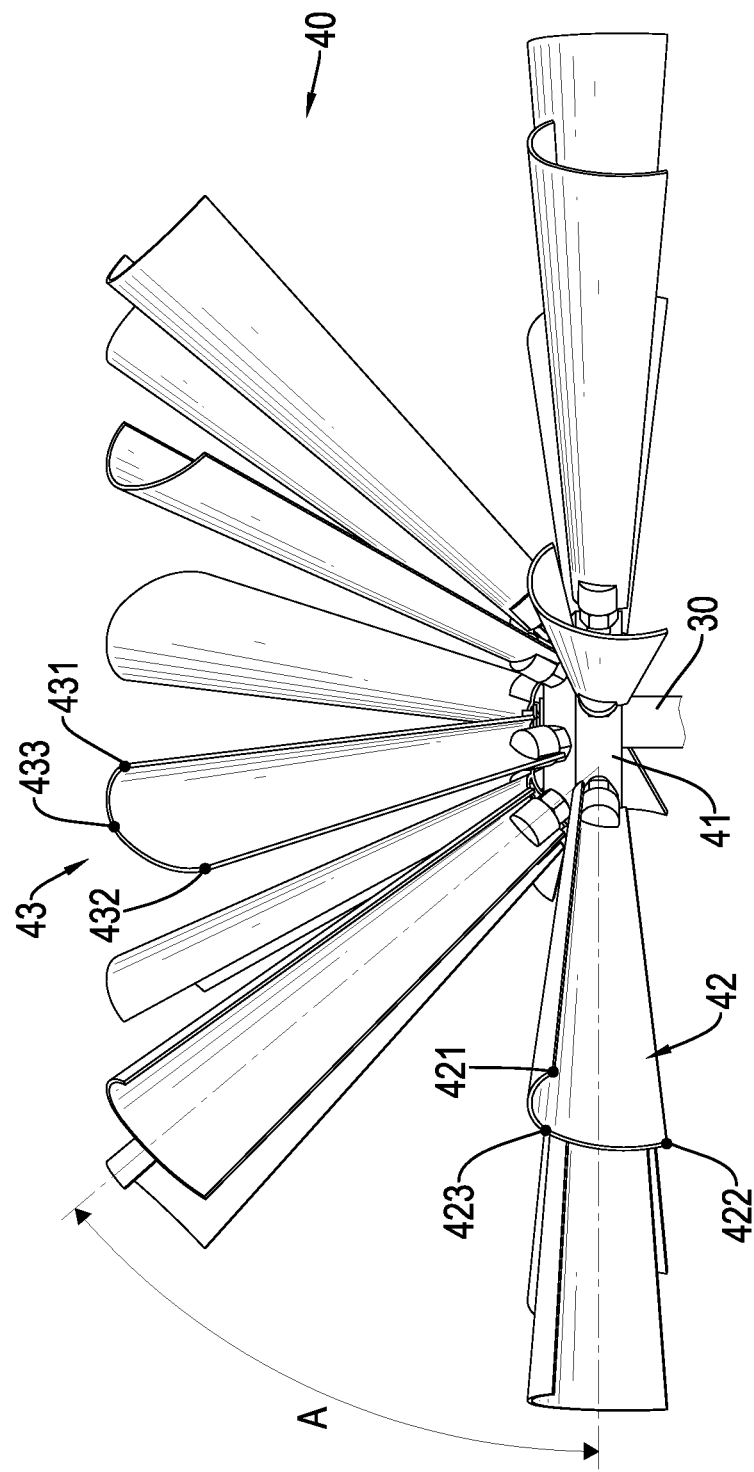
FIG. 4 is a side view of a spindle and a vane module of the fan device in FIG. 1.

With reference to FIG. 3 and FIG. 4, the vane module 40 is connected with the spindle 30 and has a vane base 41, multiple surrounding vanes 42, and multiple inclined vanes 43. The vane base 41 is connected with the spindle 30 and has a radial direction.

The surrounding vanes 42 are connected with the vane base 41 and surround the vane base 41 at intervals. Each surrounding vane 42 is elongated, arc-shaped, preferably hooked, and has a longitudinal direction, a latitudinal direction, a surrounding first side 421, a surrounding second side 422, and a surrounding driven portion 423. The longitudinal direction of the surrounding vane 42 is parallel with the radial direction of the vane base 41. The surrounding first side 421 and the surrounding second side 422 are respectively formed on the surrounding vane 42. The surrounding driven portion 423 is formed on the surrounding vane 42 between the surrounding first side 421 and the surrounding second side 422. Each surrounding vane 42 may have a cross section in the same shape as the cross sections of the fans 20, and the surrounding vane 42 has a large frontal area due to the surrounding driven portion 423.

The inclined vanes 43 are connected with the vane base 41 at intervals. Each inclined vane 43 is elongated, arc-shaped, preferably hooked, and has a longitudinal direction, an inclined first side 431, an inclined second side 432, and an inclined driven portion 433. Each inclined vane 43 is connected with the vane base 41. An inclined angle A is formed between the radial direction of the vane base 41 and the longitudinal direction of the inclined vane 43. The inclined first side 431 and the inclined second side 432 are respectively formed oppositely on the inclined vane 43. The inclined driven portion 433 is formed on the inclined vane 43 between the inclined first side 431 and the inclined second side 432. Each inclined vane 43 may have a cross section in the same shape as the cross sections of the fans 20, and the inclined vane 43 has a large frontal area due to the inclined driven portion 433.

Figure 5:
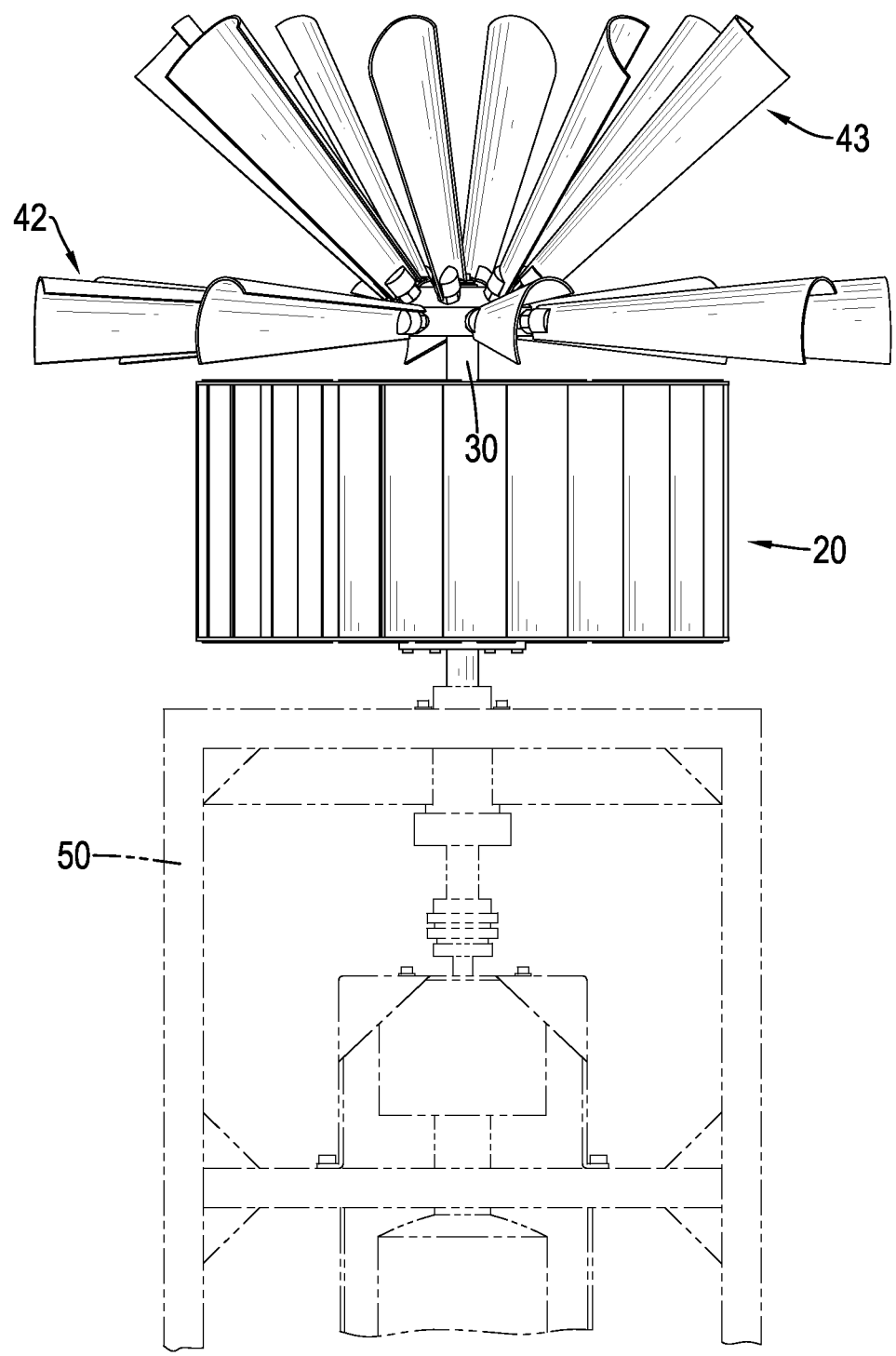
FIG. 5 is an operational side view of the fan device in FIG. 1.

With reference to FIG. 3, FIG. 4 and FIG. 5, when in use, the spindle 30 is connected with a generator 50. The fluid, such as wind or liquid, flows across the fan device to push the driven portions 23, especially the inflection point 231, the surrounding driven portions 423 and the inclined driven portions 433, such that the base plates 10, 10A, the fans 20 and the vane module 40 are driven to rotate. The spindle 30 is also driven to rotate by the base plate 10 that is mounted on the spindle 30. As the connecting line L3 is located out of the area defined between the connecting line L1 and the connecting line L2, each fan 20 has a large frontal area to be pushed by the fluid. The fans 20 are rotated rapidly, such that the fan device can generate high torque output. The surrounding vanes 42 further help the fans 20 intercept the fluid. Further, with the surrounding driven portion 423, each surrounding vane 42 also has a large frontal area to be pushed by the fluid, such that the torque output can be further increased.

When the fluid flows across the fan device from an inclined direction, the inclined vanes 43 can help the fan device to intercept the fluid to transfer the fluid into the torque. As a result, the fan device can utilize the fluid from different directions to transfer the fluid into the torque efficiently by the fans 20, the surrounding vanes 42, and the inclined vanes 43.

Figure 6:
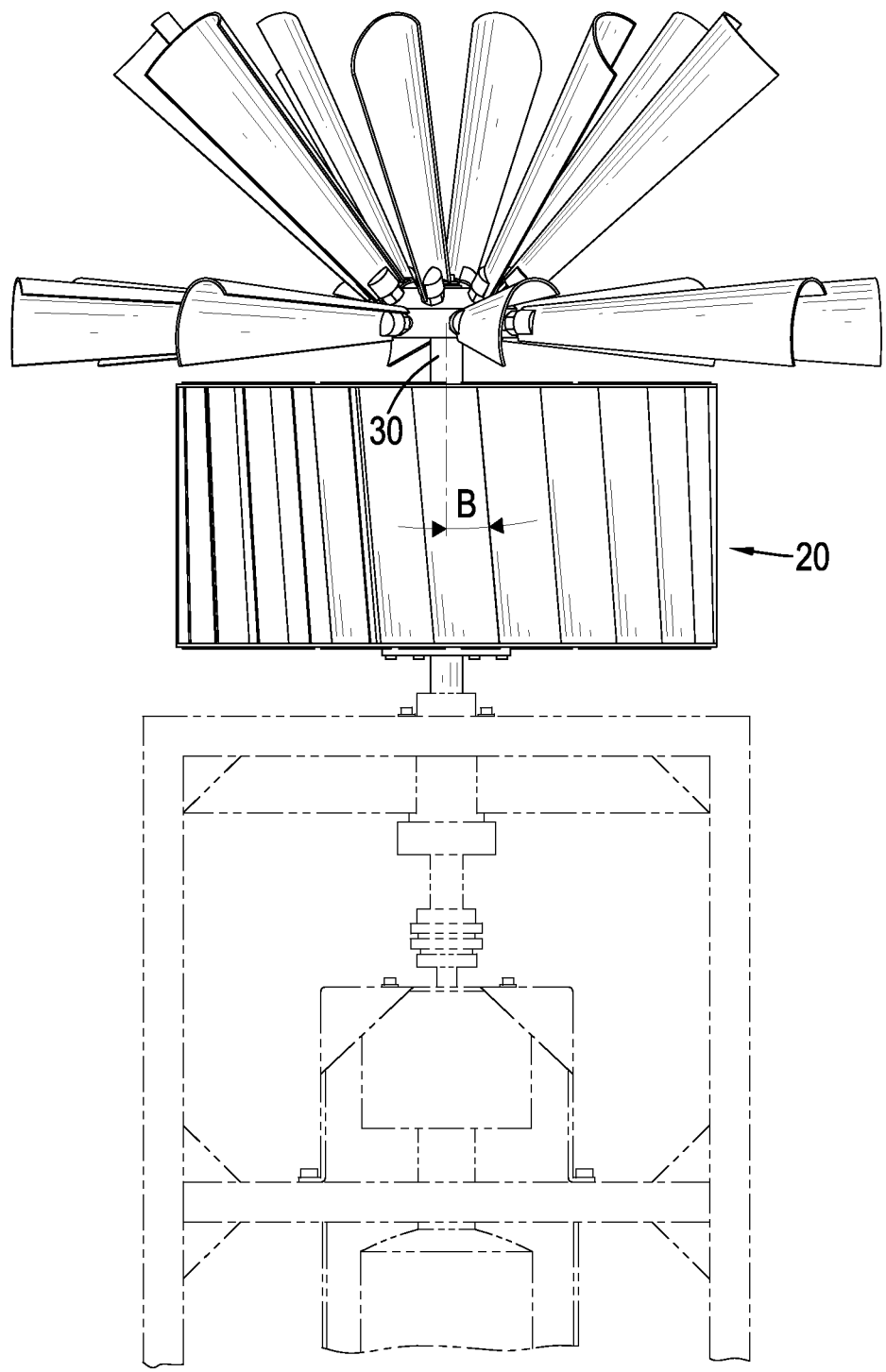
FIG. 6 is an operational side view of a second preferred embodiment of the fan device in accordance with the present invention.
Figure 7:
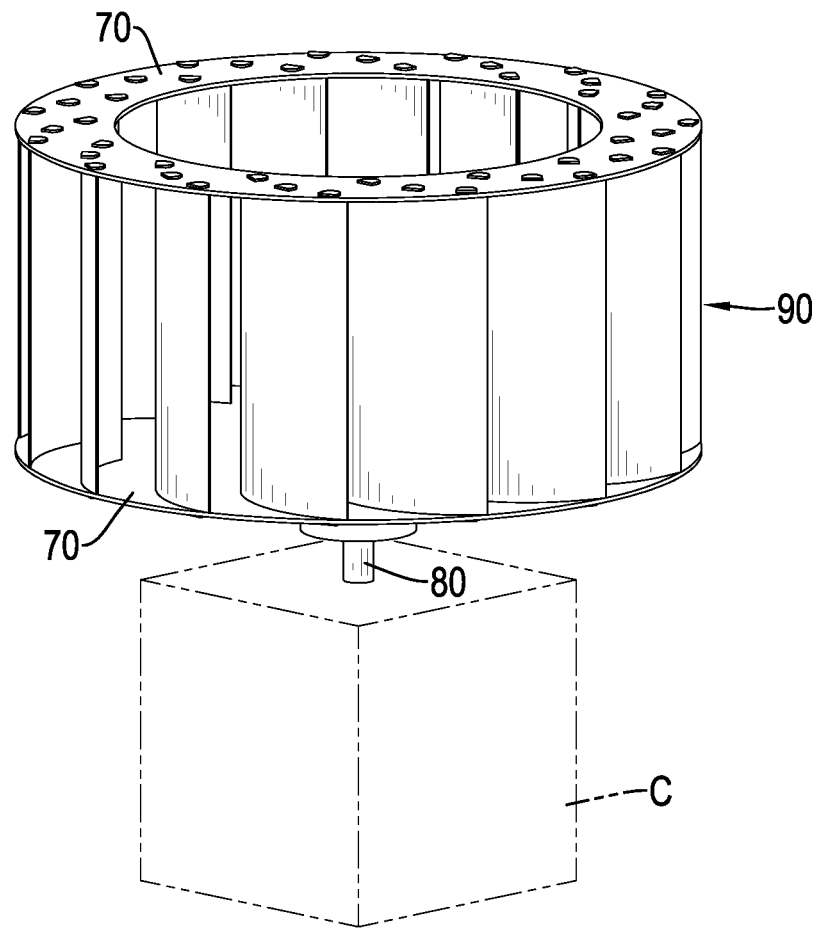
FIG. 7 is a perspective view of a conventional fan device.
Figure 8:
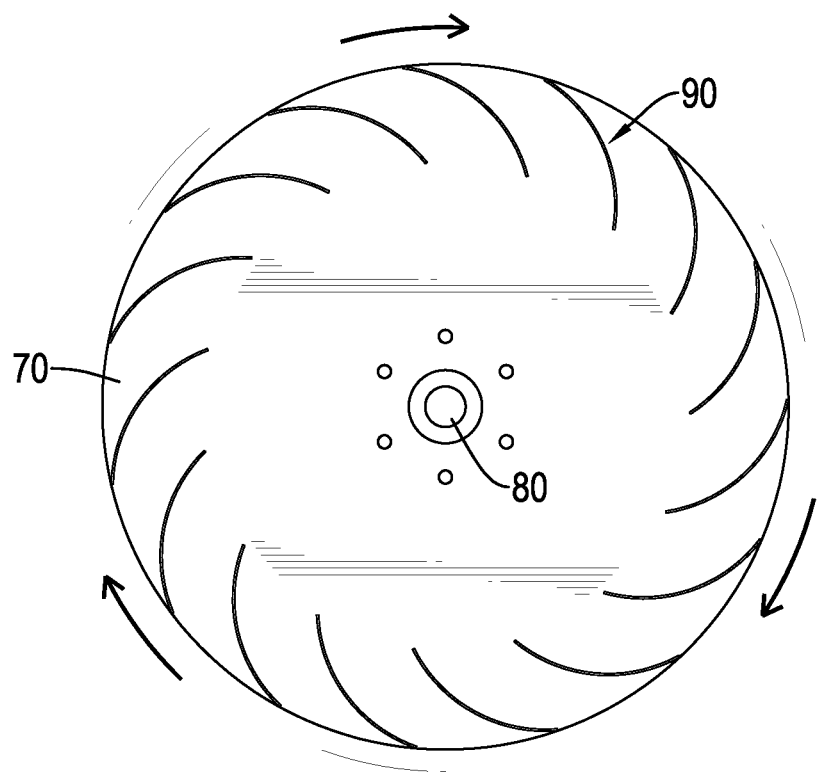
FIG. 8 is a cross sectional top view of the conventional fan device in FIG. 7.
Figure 9:
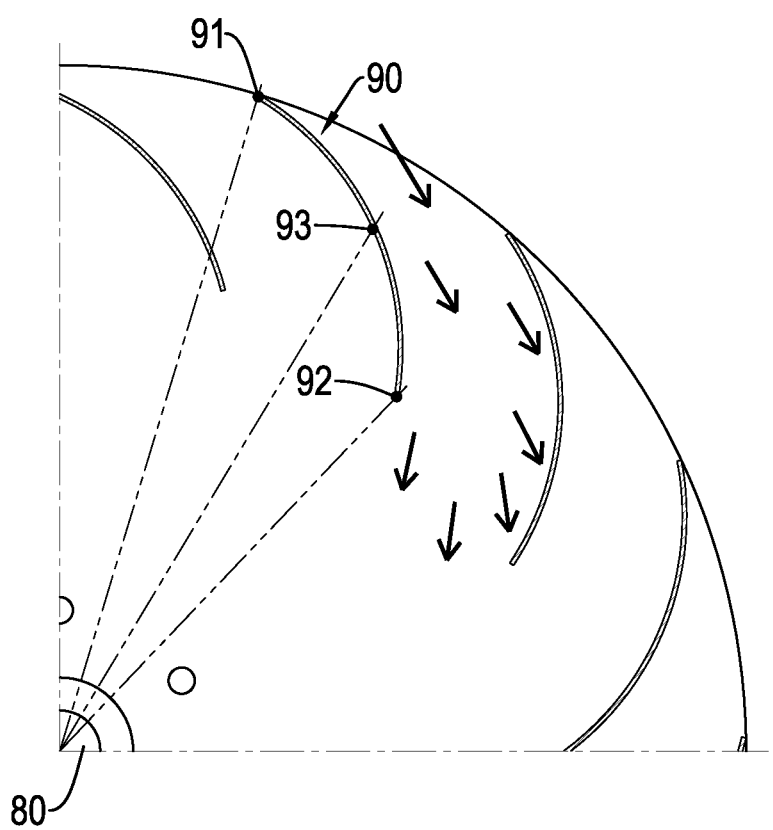
FIG. 9 is an enlarged cross sectional top view of the conventional fan device of FIG. 8.

With reference to FIG. 6, in a second preferred embodiment of the present invention, the longitudinal direction of each fan 20 is not parallel with the longitudinal direction of the spindle 30. An angle B is formed between the longitudinal direction of each fan 20 and the longitudinal direction of the spindle 30, and the angle B is preferably, but not limited to, 5 degrees. Accordingly, the fan device can be utilized for different situations in use.

What is claimed is:
1. A fan device comprising:
two base plates mounted parallel to each other;
multiple fans circularly mounted between the base plates and with intervals between the fans, wherein each fan is elongated and has
a longitudinal direction defined from one of the base plates to the other of the base plates;
an outer side formed on the fan along the longitudinal direction;
an inner side formed on the fan along the longitudinal direction; and
a driven portion formed between the outer side and the inner side and having an inflection point at a horizontal plane across the fan, wherein a curved length between the inflection point and the outer side is larger than a curved length between the inflection point and the inner side;
a spindle mounted on one of the base plates, located in a middle position of said one of the base plates that is mounted with the spindle, being nearer to the inner sides of the fans than to the outer sides of the fans, and having a longitudinal direction parallel with the longitudinal directions of the fans; wherein
a connecting line that connects the inflection point and the spindle is located out of an area defined between a connecting line that connects the outer side and the spindle and a connecting line that connects the inner side and the spindle when the inflection point, the inner side, and the outer side are located at the horizontal plane;
a vane module is connected with the spindle and has
a vane base connected with the spindle and having a radial direction;
multiple surrounding vanes connected with the vane base and surrounding the vane base at intervals and each surrounding vane being elongated, arc-shaped, connected with the vane base by a bottom end of the surrounding vane, and having
a longitudinal direction;
a surrounding first side formed on the surrounding vane along the longitudinal direction of the surrounding vane;
a surrounding second side formed on the surrounding vane along the longitudinal direction of the surrounding vane;
a surrounding driven portion formed on the surrounding vane between the surrounding first side and the surrounding second side;
multiple inclined vanes connected with the vane base at intervals, and each inclined vane being elongated, arc-shaped, connected with the vane base by a bottom end of the inclined vane, and having
a longitudinal direction;
an inclined angle formed between the radial direction of the vane base and the longitudinal direction of the inclined vane, and formed between the longitudinal direction of the inclined vane and the longitudinal direction of the surrounding vane;
an inclined first side formed on the inclined vane along the longitudinal direction of the inclined vane;

an inclined second side formed on the inclined vane along the longitudinal direction of the inclined vane;

an inclined driven portion formed on the inclined vane between the inclined first side and the inclined second side.

2. The fan device as claimed in claim 1, wherein the inflection point of each fan is nearer to the inner side than to the outer side of the fan when the inflection point, the inner side, and the outer side are located at the horizontal plane.

3. The fan device as claimed in claim 1, wherein the longitudinal directions of the fans are parallel with the longitudinal direction of the spindle.

4. The fan device as claimed in claim 2, wherein the longitudinal directions of the fans are parallel with the longitudinal direction of the spindle.

5. The fan device as claimed in claim 1, wherein an angle is formed between the longitudinal direction of each fan and the longitudinal direction of the spindle.

6. The fan device as claimed in claim 2, wherein an angle is formed between the longitudinal direction of each fan and the longitudinal direction of the spindle.

\* \* \* \* \*